United States Patent [19]

Stulken

[11] Patent Number: 4,910,525
[45] Date of Patent: Mar. 20, 1990

[54] AUDIO VERIFICATION SYSTEM AND TECHNIQUE FOR GPS RECEIVERS

[75] Inventor: Don A. Stulken, Marion, Iowa

[73] Assignee: Rockwell International Corporation, El Segundo, Calif.

[21] Appl. No.: 667,239

[22] Filed: Oct. 31, 1984

[51] Int. Cl.$^4$ ............................................... G01S 5/02
[52] U.S. Cl. ..................................... 342/418; 342/356
[58] Field of Search .................. 343/418, 356; 455/71, 455/75, 257, 258, 259, 264, 11, 12; 342/418, 356

[56] References Cited

U.S. PATENT DOCUMENTS

| | | | |
|---|---|---|---|
| 3,438,036 | 4/1969 | Bennett | 342/418 |
| 4,445,118 | 4/1984 | Taylor et al. | 342/356 |
| 4,453,165 | 6/1984 | Maine | 342/418 |
| 4,578,678 | 3/1986 | Hurd | 342/357 |
| 4,622,557 | 11/1986 | Westerfield | 342/357 |
| 4,644,358 | 2/1987 | Sekine | 342/356 |

OTHER PUBLICATIONS

Myers et al., The Radio Amateur's Handbook, 1973, p. 236.

Primary Examiner—Thomas H. Tarcza
Assistant Examiner—Mark Hellner
Attorney, Agent, or Firm—George A. Montanye; Gregory G. Williams; H. Fredrick Hamann

[57] ABSTRACT

There is disclosed a system and technique for providing an audio verification of Global Positioning System (GPS) receiver signal acquisition. In a GPS receiver, the correlated output of the GPS signal is generally represented as a data modified CW signal with a Doppler component caused by the movement of a GPS satellite with respect to the receiver. Due to the Doppler component, this signal output provides a signature which is indicative of the particular satellite from which the signal is being received. The signal output is mixed with a local oscillator to produce a beat frequency in the audio band which may be filtered and coupled to an audio amplifier to produce an audio tone. The presence of the audio tone indicates the acquisition of a selected satellite signal and its audio frequency is indicative of the particular satellite signal being received.

4 Claims, 1 Drawing Sheet

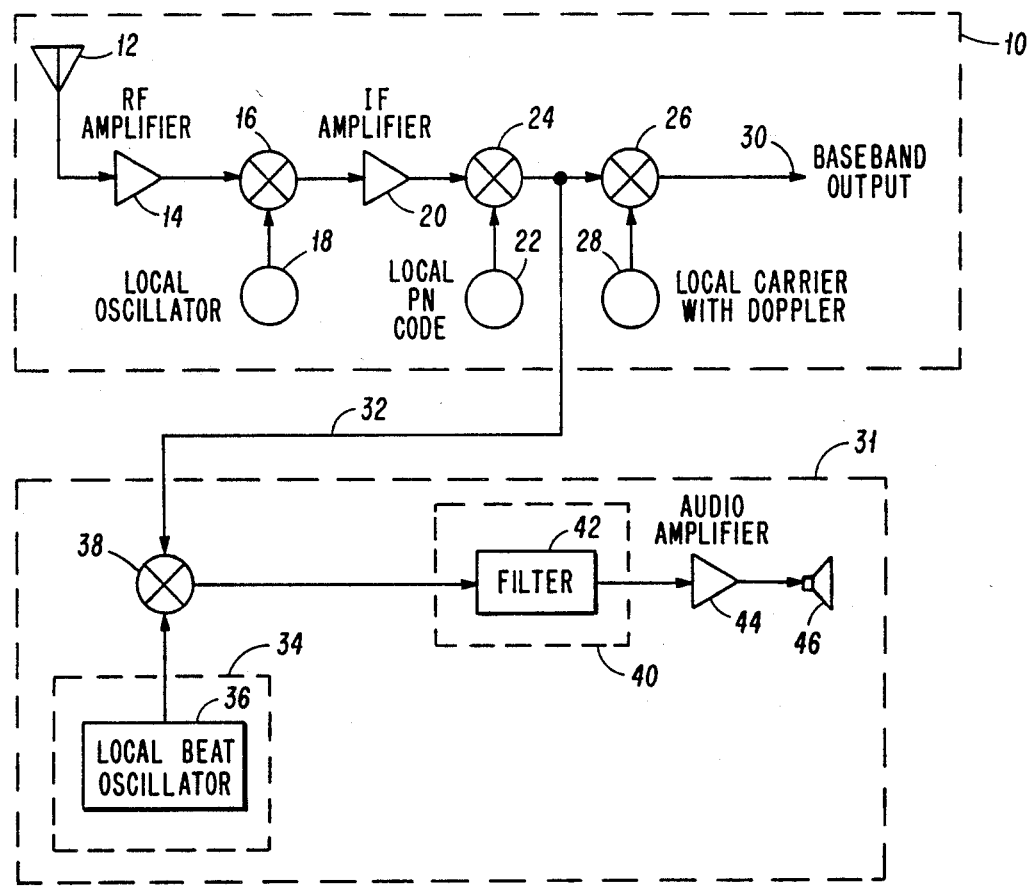
FIG 1
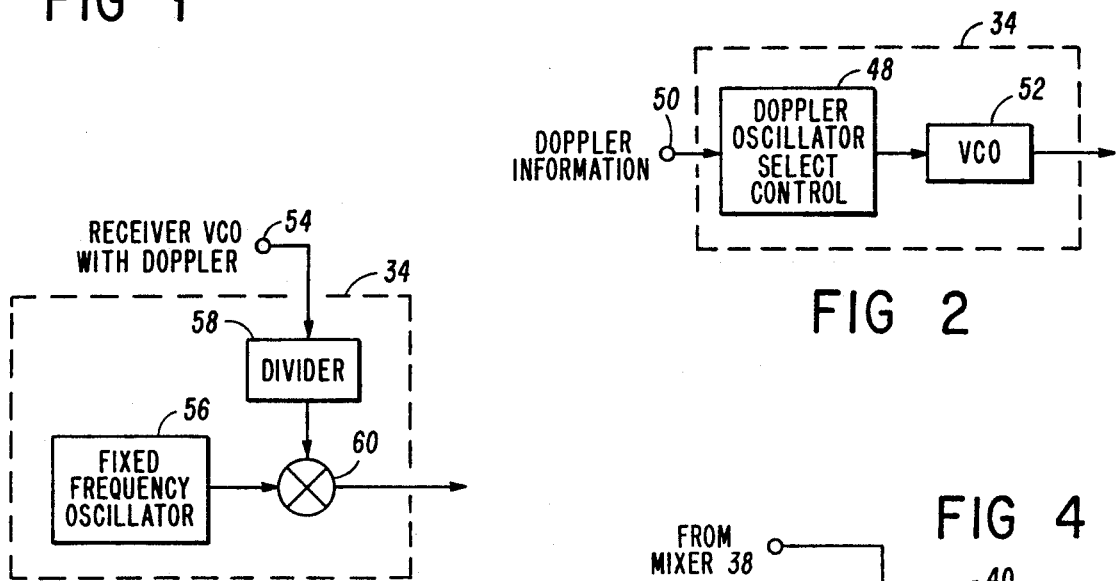
FIG 2
FIG 4
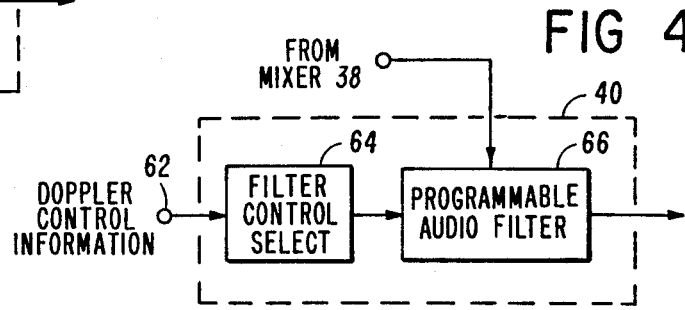
FIG 3

AUDIO VERIFICATION SYSTEM AND TECHNIQUE FOR GPS RECEIVERS

The Government has rights in this invention pursuant to contract FO4701-79-C-0083 granted June 1981.

BACKGROUND OF THE INVENTION

The present invention relates to a signal verification system and, more particularly, to a system and technique for providing an audio verification of signal acquisition and tracking in a Global Positioning System (GPS) receiver.

As is known in the art, the new generation Global Positioning System has been developed to enable the determination of a position with respect to a plurality of satellites in orbits encircling the earth. The GPS system is designed to aid in air, land, and sea navigation by enabling the calculation of a position within very accurate tolerances based solely on a plurality of signals received from selected ones of the satellites forming the system. The techniques used to calculate position, as well as a variety of other parameters related to position (velocity, altitude, acceleration, etc.) are well known. As a result, there have been proposed a variety of embodiments for enabling sophisticated navigation as well as more simplified embodiments for charting automotive vehicular movement with respect to map displays. In all cases, the receipt of properly correlated signals from the plurality of satellites is necessary to enable the computation of desired position and related parameters in the various applications.

In the GPS system, each of the individual satellites generates a carrier signal having modulated information which is transmitted by spread spectrum techniques, wherein each satellite transmission is in accordance with a particular pseudo-random code. In order to calculate position, a GPS receiver selectively acquires and tracks the signal from a plurality of the satellites. In a GPS receiver, the spread spectrum signal is normally first translated to an IF frequency and subsequently correlated by mixing with a local pseudorandom code indicative of that code of the selected satellite. The resulting output signal is then substantially a data modulated (CW) carrier signal having a Doppler component due to satellite movement. The modulated CW signal is subsequently mixed with a local carrier including the same Doppler to produce a baseband output representing only the data information. This information, along with code ranging information, is then employed with similar information from the other satellites to allow the calculation of position.

In a properly operating GPS system, the acquisition will be accomplished with automatic techniques and the calculation of position will occur in accordance with the properly correlated and received satellite signals. Naturally, if the satellite signal is not properly correlated with the local pseudorandom code generator in a receiver, the satellite signal will not be acquired or tracked. Because of the nature of the automatic operation of the system, however, even when the satellite signal is properly correlated there is generally no direct and immediate indication of satellite signal quality or signal acquisition and tracking. Therefore, as more GPS systems are employed, there is a need to provide a simple verification of signal quality and acquisition from the various satellites in order to aid operator use of the system.

Accordingly, the present invention has been developed to provide a verification of satellite signal acquisition and tracking in a GPS system which is inexpensive to implement but reinforces the level of operator confidence in the system.

SUMMARY OF THE INVENTION

In accordance with the present invention, each of the signals received from a plurality of selected satellite in a GPS system is decoded by conventional correlation techniques to produce an output signal substantially representing a data modulated CW signal modified by a Doppler component. The correlated signal is mixed with a local oscillator signal to produce a beat frequency within the audio range which has a characteristic audio frequency dependent upon the Doppler associated with the selected satellite. The audio signal is subsequently filtered and coupled to a speaker for providing an audio tone representing satellite signal acquisition and tracking. When a satellite signal is not being received or is being improperly correlated by the GPS receiver, the audio output will be a noise signal similar to that in a conventional unsquelched radio receiving system. When the GPS receiver is properly receiving and decoding the satellite signal, the Doppler impressed on the received signal creates an audio tone which is easily identifiable and associated with a selected satellite. As the receiver is sequenced to acquire subsequent satellite signals, the corresponding audio frequency reflects that acquisition and differs from the prior satellite in tone because of the different Doppler frequency associated with each satellite. In this manner, acquisition of each of a plurality of satellite signals in a GPS system can be verified solely by the distinguishing audio tones generated in response to signal acquisition.

It is therefore a feature of the invention to provide a signal verification system and technique which may be easily and inexpensively implemented.

Yet another feature of the invention is to provide an audio signal verification system and technique which may be utilized with GPS receivers to identify satellite signal acquisition.

Still another feature of the invention is to provide a system and technique for verifying signal acquisition in a GPS receiver which utilizes the correlated receiver output signal with an impressed Doppler component to produce an audio frequency signature representing a specific satellite signal.

Still a further feature of the invention is to provide an audio tone representing satellite signal acquisition in a GPS system which may be controlled over a selected audio band.

These and other advantages and novel features of the invention will become apparent from the following detailed description when considered in connection with the accompanying drawings wherein:

BRIEF DESCRIPTION OF THE DRAWINGS

FIG. 1 is a schematic diagram showing the audio verification system of the present invention.

FIGS. 2 and 3 are schematic diagrams of alternative implementations of the local oscillator in the audio portion of the system of FIG. 1.

FIG. 4 is a more detailed schematic diagram showing the use of a programmable audio filter in the audio portion of the system of FIG. 1.

DETAILED DESCRIPTION OF PREFERRED EMBODIMENTS

Referring now to FIG. 1, wherein like numerals are used to refer to like elements throughout, there is shown a schematic diagram of an audio verification system of the present invention. The system generally includes a GPS receiver designated by the reference numeral 10, and an audio signal generating portion designated by the reference numeral 31. While the GPS receiver 10 can be of any conventional construction and will not be described in great detail herein, the same generally includes an antenna 12 which receives a spread spectrum signal transmission from the GPS satellites and provides that signal through a conventional ratio frequency (RF) amplifier 14 to a first mixer 16. The first mixer 16 mixes the received RF signal with a local oscillator signal from local oscillator 18 to produce an intermediate frequency (IF) signal. The intermediate frequency signal from the mixer 16 is then coupled through an intermediate frequency amplifier 20 and thence to one input of a second mixer 24. The IF signal from amplifier 20 is then mixed with a signal from a local pseudorandom code generator 22 which provides a selected pseudorandom code identical to that of the code of the satellite signal desired to be acquired and tracked.

The pseudorandom code is mixed in mixer 24 to provide a reconstruction/decoding by correlation in mixer 24. This produces essentially a data modulated CW signal having a Doppler shift as a result of the movement of the selected satellite with respect to the GPS receiver. In a conventional receiver, the correlated data modulated CW signal is then mixed in mixer 26 with a local oscillator having a frequency equal to the CW signal and a Doppler component identical to that on the received satellite signal. As a result of the mixing at 26, the Doppler component is removed and a baseband output of the modulated data is provided at terminal 30. This data output is then coupled to conventional processing circuitry to aid in position calculation, tracking control, and a variety of other conventional functions of the GPS receiver.

As was previously explained, the baseband output at 30, when combined with code-ranging information, provides the information necessary to allow position determination and navigation control in an automatic manner. Thus, upon receipt of the correlated output from mixer 24, the baseband output will be a correct representation of the data transmitted by the satellite signal. In normal operation, the calculations will occur automatically and the display and updates will occur without any operator interface. Accordingly, an output on the display and the associated calculations will indicate and affirm that the satellite signals are being received as intended.

As will be appreciated, however, without any direct indication of signal acquisition or quality, there may be uncertainty concerning the operation of the system, particularly for unskilled or non-technical operators. The indication provided by the indirect calculations may therefore be suspect to an operator. Thus, while the operation of the system may be correct, there is no operator reinforcement or direct operator indication which allows a determination of the quality of the signal being received from the satellites.

In order to overcome the above, the audio portion 31 of the GPS receiver is coupled to receive the data modulated and Doppler shifted CW carrier signal provided as the output from mixer 24. This carrier signal is coupled over line 32 as one input to the audio portion 31 at mixer 38. The input from a local oscillator 34 is also provided as a second input to mixer 38 with the local oscillator frequency from 34 being selected to produce a beat frequency output from 38 in the audio range. The audio output frequency from 38 is then coupled through an audio filter 40 and thence to an audio amplifier 44 before driving a speaker 46 or other appropriate audio transducer (e.g. earphones, tape recorder, etc.) to produce an audible tone. In the embodiment shown in FIG. 1, the local oscillator 34 is defined as a fixed oscillator 36 and the filter 40 is defined as a fixed bandwidth filter 42 which are coupled to produce an audio frequency with a broad range dependent upon the Doppler component associated with the CW signal.

In accordance with the audio portion 31 of FIG. 1, during normal GPS receiver use, the audio output from the speaker 46 will only be noise (similar to an unsquelched FM receiver under no-signal conditions) when no satellite signals are being received. However, when a satellite signal is acquired and tracked, the audio frequency produced by mixer 38 will result in an audible tone from speaker 46 which has a frequency dependent upon the Doppler associated with the satellite signal. The audio tone is thus characteristic of the particular satellite signal which has been acquired and tracked. As the GPS receiver is cycled to sequentially select each of the multiple satellite signals required for position calculations, the audio tone at the output of speaker 46 will change in response to the changing Doppler associated with each signal. In practice, the switch from one satellite signal to the next is clearly audible by the change in tones produced by the speaker 46, thereby providing an indication of satellite acquisition and tracking as well as the change from one satellite to the next. The audible tones are easily discerned and distinguishable from the non-tracking condition when only noise is provided at the output of speaker 46.

As will be appreciated, in accordance with the above system, there is provided an immediate discernible audio output in response to satellite signal acquisition and tracking. Thus, an operator may easily identify signal receipt and quality by listening to the audio output. This provides a reinforcing audio verification of satellite signal acquisitions and tracking, thus indicating proper GPS receiver operation. The audio portion 31 therefore provides an easy and inexpensive verification of the receiving condition which may be understood by nonskilled and non-technical operators.

In accordance with the above system of FIG. 1, where the oscillator 34 is a fixed frequency oscillator 36, the audio spectrum provided at the output of mixer 38 is determined solely by the Doppler shifts associated with the received satellite signals. Thus, if the frequency of oscillator 36 is set to the center frequency of the received signal, the audio signals will be the same as the actual Doppler shifts of the satellites. In actual practice, the range of Doppler shifts expected for satellites received by a stationary receiver is in the range of ±4500 Hz and thus would produce tones of between 0 Hz and 4500 Hz, with a frequency centered local oscillator 36. In practice, it is more desirable to offset the local oscillator 36 from the center frequency so that there is never a 0 Hz tone and so that an operator can hear the difference between a ring and setting satellite in the sequenching of the multiple satellites. By way of example, a practical offset of approximately 5 kHz has been found to provide acceptable results.

While implementation of the above embodiment will produce the desired audio tones necessary to verify acquisition and tracking, the approximately 9 kHz (±4500 Hz) audio spectrum produced by the audio portion 31 may be too large for all applications and easily discernible tones. Such a frequency spread may also require more sensitive speakers and thereby limit the use of less expensive speakers. Accordingly, in order to improve the operation of the audio portion 31, the signal processing of the audio signals can be modified to compress the spectrum of the audio signals produced. This may be accomplished by shifting the frequency of the local oscillator 36 in response to the expected Doppler shift of the satellite signals as is normally performed in the GPS receiver by local oscillator 28. In such instances, the expected Doppler shift of the signals can be used to change the local oscillator frequency 36 in the same manner, but by a smaller amount than that normally employed by the local oscillator 28. This may be accomplished in accordance with the embodiments of FIGS. 2 and 3 as will be explained below.

Referring now to FIG. 2, in one alternative embodiment of the oscillator 34, the Doppler information used in a conventional GPS receiver to control local oscillator 28 is coupled to terminal 50. From this Doppler information, a control 48 calculates a desired Doppler beat frequency with a value necessary to produce the desired range of the audio spectrum compression. This output from 48 is provided to control input of a VCO 52 which then produces the local oscillator output from 34 necessary to produce the desired audio range at the output of 38. The select control 48 may be a look-up table which provides an output for controlling the VCO 52 in a predetermined fashion in response to the particular Doppler information received at 50, or may be any other computing or processing device capable of converting the Doppler information at 50 into a form for controlling the VCO 52 such that the audio spectrum output at mixer 38 has a compressed range.

In still another alternative to the fixed oscillator 36, there is shown in FIG. 3 another embodiment of the oscillator 34. In this instance, the output from the receiver VCO 28 is coupled to terminal 54 and reflects the nominal CW carrier frequency from 24 plus the anticipated Doppler. This signal from terminal 54 is then devided by a predetermined amount in divider 58 and provided as one input to the mixer 60. A fixed frequency oscillator 56 provides a fixed frequency as a second input to mixer 60 which then provides its output used as the input to mixer 38. This subfrequency or subcomponent frequency of the receiver produces a signal output from 38 which has a more limited audio band and thus a more discernible audio tone for a given range of Doppler frequencies. In both of the FIGS. 2 and 3 embodiments, the effect of the control of local oscillator 34 is to limit and compress the audio band that produces the audio tones at the speaker 46.

In the embodiment of FIG. 1 employing a fixed frequency filter 42, the filter must have a passband which will extend over that range of the audio tones expected to be produced by the output of the mixer 38. In actual practice, this may be too large, leading to an insufficient signal-to-noise ratio at the speaker 46. While the use of the above-noted audio spectrum compression techniques will serve to reduce the required filter bandwidth, it may be desirable to provide a very narrowband audio filter 40 to improve the signal-to-noise ratios provided at the speaker 46. This can be accomplished with the programmable filter embodiment of FIG. 4 which will provide still further improvement in the audio signal output for both compressed and uncompressed operation.

In accordance with FIG. 4, the same Doppler control information received by the local oscillator 28 is provided at terminal 62 as one input to filter 40 and filter control selector 64. In the same manner as was described with respect to select control 48, the filter control select 64 calculates or looks up a control value in response to the anticipated Doppler shift. The control selector 64 then provides an output related to that Doppler information which is coupled to a programmable audio filter 66 of conventional construction. More specifically, the programmable audio filter 66 responds to the signal from 64 to change the center frequency of the filter in accordance with the Doppler shift information received at 62. This allows a very narrowband filter to be used while still tracking the audio tones over a substantially wider bandwidth and results in an improved signal-to-noise ratio for improving the quality of the audio tone. The tracking filter may be optionally implemented in connection with the embodiments of FIGS. 2 and 3, but is normally required when used in connection with the embodiment of FIG. 1 in order to reduce the limiations imposed by low signal-to-noise ratios.

As can be seen from the above, the present invention provides an easily implemented and inexpensive technique for providing audio verification of satellite signal quality and acquisition in a GPS receiver. The system can be implemented with conventional components to produce easily discernible audio tones representing the characteristic Doppler shift of a plurality of GPS satellite. The audio signal provides a direct indication of the quality of the received GPS satellite signal and thus provides the ability to discern the proper operation of the receiver other than by indirect viewing of the status and position calculations. These are all features which are not shown or suggested in the prior art.

Obviously, many other modifications and variations are possible in light of the above teachings. For example, although the embodiments described herein were generally related to a single channel GPS receiver, the same may also be applied to multichannel GPS receiver by use of appropriate multiplexing techniques. It is therefore to be understood that within the scope of the appended claims, the invention may be practiced otherwise than as specifically described.

What is claimed is:

1. In a global positioning receiver system having means for receiving an encoded satellite signal, means for decoding said encoded satellite signal to produce a data modulated carrier signal which includes a Doppler component, and means for mixing said data modulated carrier signal with a local oscillator signal including said Doppler component to produce a baseband signal representing said modulating data, the improvement comprising:

means for providing a reference frequency;

means for mixing said reference frequency with said carrier signal to produce a beat frequency within an audio frequency range representing said Doppler component; and means responsive to said beat frequency for providing an audio signal representative of said Doppler component.

2. In a global positioning receiver system having means for receiving an encoded satellite signal, means for decoding said encoded satellite signal to produce a data modulated carrier signal which includes a Doppler component, and means for mixing said data modulated carrier signal with a local oscillator signal including said Doppler component to produce a baseband signal representing said modulating data, the improvement comprising:

means for providing a reference frequency, including means responsive to said Doppler component for providing a mixing signal which includes said Doppler component;

means for dividing said mixing signal to provide a divided mixing signal;

means for providing a fixed frequency;

means for mixing said divided mixing signal and said fixed frequency to produce an output employed as said reference frequency;

means for mixing said reference frequency with said carrier signal to produce beat frequency within an audio frequency range representing said Doppler component; and means responsive to said beat frequency for providing an audio signal representative of said Doppler component.

3. In a global positioning receiver system having means for receiving an encoded satellite signal, means for decoding said encoded satellite signal to produce a data modulated carrier signal which includes a Doppler component, and means for mixing said data modulated carrier signal with a local oscillator signal including said Doppler component to produce a baseband signal representing said modulating data, the improvement comprising:

means for providing a reference frequency, including means responsive to said Doppler component for providing a control signal, and means responsive to said control signal for providing a variable frequency as said reference frequency such that said beat frequency has a compressed audio range;

means for mixing said reference frequency with said carrier signal to produce a beat frequency within an audio frequency range representing said Doppler components; and means responsive to said beat frequency for providing an audio signal representative of said Doppler component.

4. A method for identifying the acquisition of radio frequency signals, each having a possible Doppler component from a multiplicity of global positioning satellite transmitters comprising the steps of:

receiving the ratio frequency signals from the multiplicity of transmitters;

heterodyning said radio frequency signals to produce a multiplicity of audio frequency tones;

converting said multiplicity of audio frequency tones to sounds representative of the Doppler component; and switching the converting means among said multiplicity of audio frequency tones to contrast the sound tones representative of said Doppler components associated with each of said transmitters.

* * * * *